July 16, 1929.  R. E. MANLEY  1,721,227
BRAKE RETAINER
Filed July 18, 1927
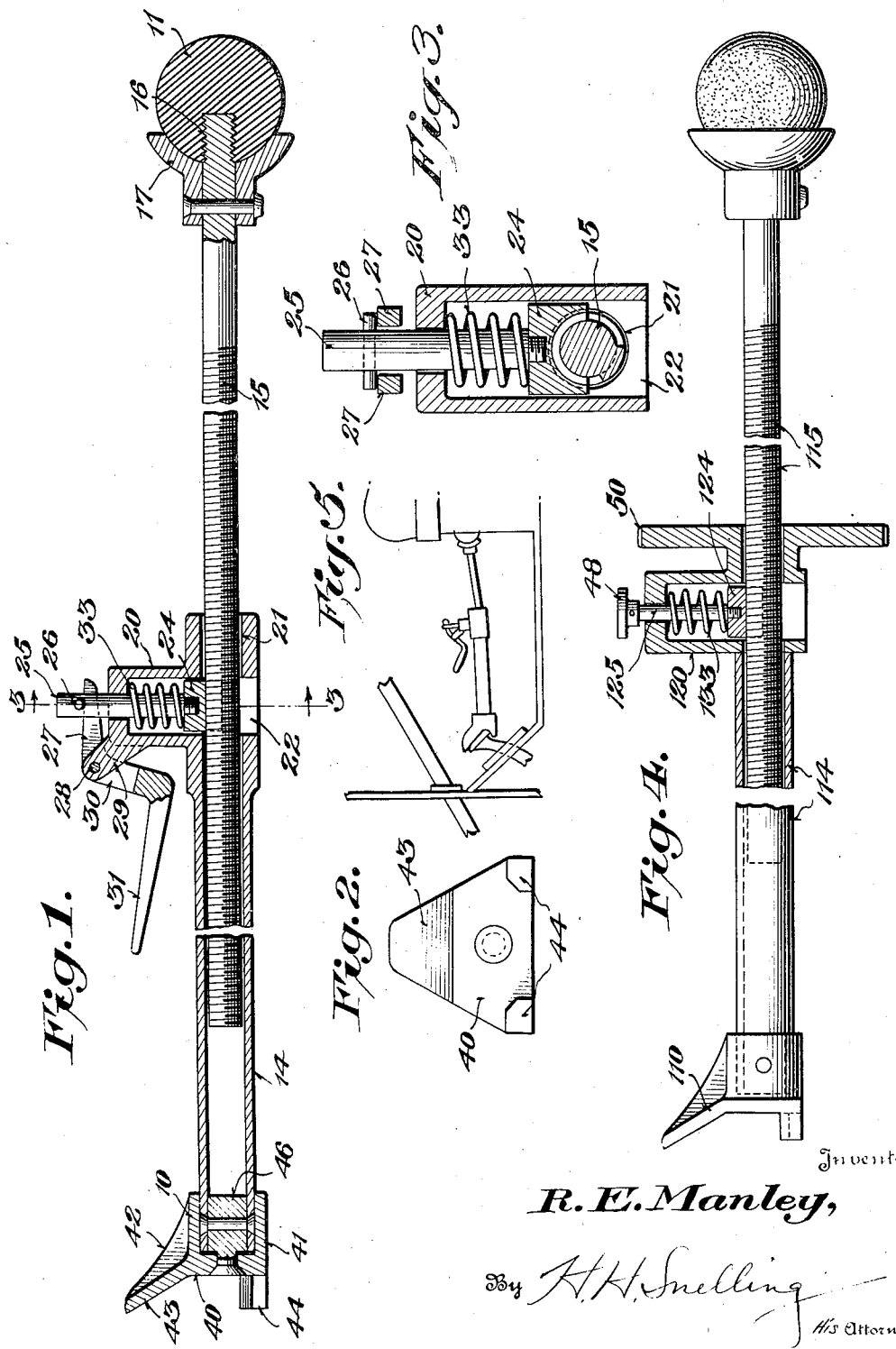
Inventor
R. E. Manley,
By H. H. Snelling
His Attorney Patented July 16, 1929.

1,721,227

UNITED STATES PATENT OFFICE.

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE.

BRAKE RETAINER.

Application filed July 18, 1927. Serial No. 206,631.

This invention relates to devices for holding the brakes of an automobile in set position while adjusting the friction of the ground wheel brakes and has for its principal object the provision of a simple and efficient tool of light weight, capable of quick adjustment and equally rapid removal from set position. A further object of the invention lies in the provision of a device of the character described in which all of the members are permanently fastened to one or the other of the two principal parts of the device so as to minimize loss of parts.

In regulating the tension of a pair of brakes or of four-wheel brakes it is quite essential, in order to have an accurate job, that the brake lever be set to a chosen point and held there during the operation and that the means whereby the brake may be held shall be rapid of operation as otherwise no saving is had over having one mechanic or assistant apply the brakes while the other does the adjusting.

Figure 1 shows an elevation of the device partly in central longitudinal cross section.

Figure 2 is an end view.

Figure 3 is a section on line 3—3 of Figure 1.

Fig. 4 shows a modification.

Fig. 5 shows the device in operation.

In the form of the device shown in Figure 1 the bar is illustrated as having at one end a brake pedal engaging claw 10 and having at the other end a rubber ball 11 or other cushioning means adapted to frictionally engage the instrument board of the automobile, said ball constituting a friction member. This bar consists of two members which are relatively movable and which should be parallel, preferably telescoping as illustrated in the figure. The tube or sleeve 14 is permanently secured to the claw 10 in any desirable manner so that the claw is free to rotate, and the cushioning means 11 is affixed to the free end of a threaded rod 15 which freely telescopes into the sleeve 14. A convenient method of securing the cushioning means 11 to the rod 15 is by threading the rod rather coarsely at its end as at 16 and by riveting to the rod a frusto-spherical collar 17. In case the cushioning device is a solid rubber ball as shown it may be cemented both to the thread 16 and the collar or cup 17.

A housing 20 which may be substantially integral with the sleeve has a longitudinal bore 21 which is a continuation of the bore of the sleeve and like it freely receives the threaded rod 15, and also has a transverse opening 22 preferably square or rectangular in cross section in which slides a half nut 24 having a stem 25 which passes thru the top of the housing where a transverse pin 26 is engaged by the forked end 27 of a lever pivoted as at 28 to a bracket 29 integral with the housing. The lever from its pivot point extends toward the sleeve as at 30 and continues nearly parallel to the rod as at 31, this latter portion being held in the position illustrated by the spring 33 loosely surrounding the stem 25 and engaging the half nut 24 and the end wall of the bore 22. When the lever is depressed the portion 31 lies exactly parallel to the sleeve or tube 14 and at a small distance therefrom so that when the portion 31 is received in the palm of the hand of the operator his four fingers may conveniently close about the sleeve and since in general this is near the center of gravity of the device as a whole the entire tube may be most conveniently positioned by one hand.

The pedal engaging member or claw may be any preferred type and is conveniently a plate 40 with an integral socket 41 connected and strengthened by a rib 42 which extends to the top of the sloping projecting portion 43 which extends substantially in line with the usual two feet 44. The socket 41 loosely engages the sleeve 14 so that the claw is rotatable about the sleeve and a plug 46 is provided to prevent relative axial movement of the claw and sleeve.

In the modification shown in Figure 3 the housing 120 is not fast to the sleeve 114 but the claw 110 is fast to the sleeve. In this simpler form the lever is eliminated and the stem 125 carries a circular head or handle 48 by means of which the half nut 124 can be withdrawn from engagement with the rod 115.

A hand wheel 50 is secured to or is integral with the housing 120 and is coaxial with the rod 115 serving to rotate the housing and half nut about the rod when the half nut is in engagement with the rod and also to move the housing with respect to the rod when the half nut is held out of engagement by the handle 48 compressing the spring 133.

The operation of the device is as follows: The automobile, the brakes of which are to be tested, is jacked up or driven on the usual brake testing device and the brakes are now set to approximately the half-way point by placing the claw 10 over the brake pedal, pulling the rod 15 out of the sleeve 14 while holding the half nut 25 out of engagement with the rod 15 until the ball or other cushioning device 11 rather firmly engages the instrument board. The lever 31 or handle 48 is now released and the half nut 25 is in mesh with the threads on rod 15 so the entire housing acts as a nut which may be rotated thru the arc necessary to depress the brake pedal the exact amount desired. The two brakes are respectively loosened and tightened by a cut and try method until the two testing instruments each records the same number of pounds and when correct the brake pedal is released by the simple act of depressing the lever 31 or by pulling out the handle 48.

While the modified form shown in Figure 3 operates very successfully the form shown in Figures 1 and 2 is preferable in that it is much easier to operate as the location of the lever is such that the operator may with one hand position the claw on the brake pedal and hold it there while gripping the lever with that hand, thus leaving his other hand entirely free to make the coarse adjustment by sliding the rod until the rubber ball is in engagement with the instrument board and he may now keep his second hand in engagement with the ball while turning the housing with the hand that he had previously depressed the lever.

What I claim is:

1. In combination, a sleeve, a threaded rod freely slidable therein, a resilient cushion secured to said rod, a brake pedal receiving claw rotatably mounted at one end of the sleeve, a nut housing, a half nut held by said housing against movement toward said claw while free to move toward and away from the axis of the bar, means resiliently holding the half nut in mesh with the threads of the rod, and a lever extending parallel to the sleeve for holding the half nut out of threaded engagement with the rod when the lever is pressed toward the sleeve, so that an operator may grasp the sleeve and lever with one hand holding the claw against the pedal and withdraw the rod with his other hand until the cushion engages the instrument board, and thereupon release the lever and obtain a closer positioning of the device by rotating the housing with respect to the cushion and claw.

2. In a device of the character described, a telescoping bar consisting of a threaded rod and a sleeve telescopingly receiving the rod, a friction member at one end of the bar and a pedal engaging member at the other end, a housing rotatable with respect to said pedal engaging member, a nut within said housing resiliently held in engagement with the threaded rod, and means for manually holding said nut out of engagement with the rod whereby the rod may be telescoped into or out of the sleeve for major or coarse adjustment and by releasing said manually controlled means minor or fine adjustment may be had by rotating the housing with respect to the pedal engaging member.

3. In a device of the character described, a telescoping bar consisting of a threaded rod and a sleeve receiving the rod, a brake engaging member at one end of said bar and a friction member at the other end, a housing slidable along the rod and rotatable with respect to the brake engaging member, and means within the housing to engage the rod threads at will whereby the housing then becomes an adjustable nut on the rod to prevent closer approach of said members, while the release of said means permits the free telescoping of the rod into the sleeve with a consequent close approach of the two members.

4. In a device of the character described, a telescoping bar consisting of a threaded rod and a sleeve receiving the rod, a brake engaging member at one end of said bar and a friction member at the other end, and a spring pressed threaded member engaging said rod and held against movement longitudinally of the sleeve.

5. In combination, a sleeve, a threaded rod freely slidable therein, a half nut held against axial movement, a lever having a manually engageable portion parallel to the sleeve for holding the half nut out of engagement with said rod, and a spring for holding the half nut in active engagement with the threads of the rod and holding the lever away from the sleeve, the position of the lever being such that a user may grasp the sleeve and lever in one hand and position the device with such hand leaving the other hand free to slide the rod into or out of the sleeve upon withdrawal of the half nut.

6. In a device of the character described, a telescoping bar consisting of a threaded rod and a sleeve receiving the rod, a brake engaging member at one end of said bar and a friction member at the other end, and a nut engaging said rod and held against movement longitudinally of the sleeve.

In testimony whereof I affix my signature.

ROBERT E. MANLEY.